June 11, 1940.  J. NEUFELD  2,204,438

POSITION DETERMINING SYSTEM AND METHOD

Filed June 12, 1937

INVENTOR

Jacob Neufeld

Patented June 11, 1940

2,204,438

UNITED STATES PATENT OFFICE 2,204,438

POSITION DETERMINING SYSTEM AND METHOD

Jacob Neufeld, Tulsa, Okla.

Application June 12, 1937, Serial No. 147,995

13 Claims. (Cl. 250—2)

This invention relates to a positioning system and method and has as its object to aid an airplane pilot to determine his exact position with regard to the territory over which he is flying.

Another object of this invention is to provide a positioning system and method to aid airplane pilots in blind landings that gives pilot position of his airplane regardless of the direction from which the airplane approaches the landing field.

A further object of this invention is to provide a method of and apparatus for guiding aircraft along a definite line in space and for indicating its position on that line.

More particularly, objects are to provide methods of and apparatus for establishing in space a coordinate system formed by a superposition of three antenna radiation patterns and to afford a two dimensional determination of the position of an aircraft with respect to the said coordinate system.

Other objects of the invention will appear in the course of the following description.

In accordance with my invention the position determining system comprises a fixed installation located in a given geographical area over which the craft is flying and a mobile installation located in the craft. The fixed installation consists of at least three radio transmitting stations arranged at different locations in the said area, each of the said transmitting stations establishing in the space at which the craft is located a distinct and identifiable radiation pattern. The mobile installation located in the craft consists of a navigational map of the said area and of an indicating apparatus. The navigational map is provided with two sets of suitably selected coordinates, each of the said coordinates being represented by a family of curves. By means of these coordinates the location of any point in the said area may be expressed by two numbers, one of the said numbers indicating the location of the point with reference to one set of coordinates and the other number indicating the location of the point with reference to the other set of coordinates. The indicating apparatus is adapted to receive signals from the radiation patterns of the said transmitting stations and to produce automatically and continuously indication of the two numbers expressing the positional coordinates of the craft on the navigational map. Thus the pilot by observing the indications of the said device and referring them to the map is able to locate the position of his craft.

The invention will be described more in detail in connection with the enclosed drawing, in which.

Figure 1:
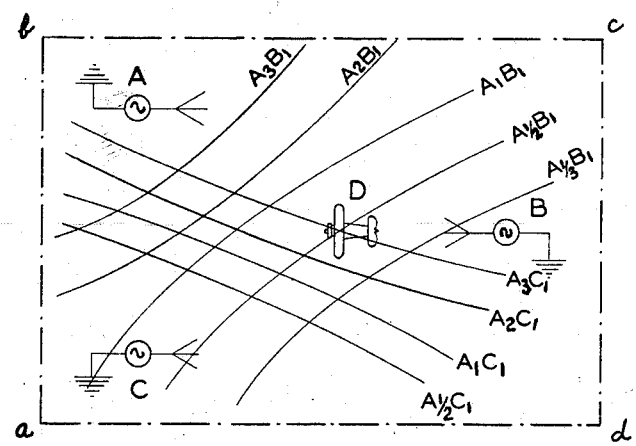
Fig. 1 is a navigational map which is located in the craft and represents the portion of the country over which the craft is flying.

Referring now more particularly to Fig. 1, the instantaneous position of the craft has been shown on the navigational map and indicated by the letter D. It is, however, understood that the indication of the craft is not part of the map itself and has been merely shown in order to understand better the functioning of the invention.

In the navigational map three radio transmitting stations A, B and C are shown positioned in a desirable manner in the territory over which the craft is flying. The dotted rectangle $abcd$ indicates approximately the extent of territory which may be conveniently covered by this group of stations. The territory which may be covered by any group of stations is limited only by the transmitting range of the stations and the distance at which they are spaced from each other. The stations A and C are shown near the corners $b$ and $a$ of the rectangle while the station B is shown near the midpoint of the side $cd$ of the rectangle. However, this arrangement of the stations A, B and C is not necessary and any other suitable arrangement may be acceptable.

The stations A, B and C transmit electromagnetic waves of the same carrier frequency but modulated at different frequencies, the modulating frequencies being designated by $f_A$, $f_B$ and $f_C$ respectively. The waves radiated are of relatively low frequencies, the frequencies being such that the antenna patterns are substantially independent of the night effects and the weather conditions. These waves are transmitted over the surface of the earth which acts as an imperfect conductor and therefore absorbs part of the wave energy as the waves progress. Due to the energy absorption in the earth, each of the waves radiated by the stations A, B and C becomes attenuated with the distance. Consequently the strength of the field radiated by the antenna A decreases as the distance from the antenna increases and the same holds true for the antenna B and C. The exact law of attenuation of the waves transmitted by the stations A, B and C may be experimentally determined and depends largely upon the topographic conditions of the territory over which the radiation takes place.

As shown in Fig. 1 the navigational map is provided with two sets of coordinates one of which includes the lines $A_3B_1$, $A_2B_1$, $A_1B_1$, $A_{1/2}B_1$, $A_{1/3}B_1$ while the other set of coordinates includes the lines $A_{1/2}C_1$, $A_1C_1$, $A_2C_1$, $A_3C_1$. These coordinates express certain relationships between the signal strengths derived from the antenna A, B and C. For instance the line $A_1B_1$ represents the locus of points at which the strength of the signal having frequency $f_A$ is equal to the strength of the signal having frequency $f_B$. Or the line $A_nB_1$ represents the locus of points at which the strength of the signal having the frequency $f_A$ is $n$ times larger than the intensity of the signal having the frequency $f_C$. In a similar manner the lines $A_mC_1$ represents the locus of points at which the strength of the signal having the frequency $f_A$ is $m$ times larger than the intensity of the signal having the frequency $f_C$. Thus the radiation patterns of the antennas A, B and C provide a system of curvilinear coordinates such as $A_nB_1$ and $A_mC_1$ (where $n$ and $m$ may be any integer or any fraction).

It is apparent that the location of a point which results from the intersection of curves $A_nB_1$ and $A_mC_1$ may be expressed by means of two numbers, $n$ and $m$, the number $n$ expressing the ratio of magnitudes of the signals having frequencies $f_A$ and $f_B$ and the number $m$ expressing the ratio of magnitudes of signals having frequencies $f_A$ and $f_C$. For instance a point located on the intersection of lines $A_3B_1$, and $A_{1/2}C_1$ may be expressed by the numbers 3 and ½.

In order to plot the coordinates $A_nB_1$ and $A_mC_1$ on the navigational map of Fig. 1 it is necessary to perform a number of measurements at various points on the geographical territory included in the said map. Each of the said measurements consists in determining at various points the strength of signals having frequencies $f_A$, $f_B$ and $f_C$ respectively. By dividing the strength of the signal having frequency $f_A$ by the strength of the signal having frequency $f_B$ the value $n$ for a given point is obtained and by dividing strength of the signal having frequency $f_A$ by the strength of the signal having frequency $f_C$ the value $m$ is obtained. Then all the points corresponding to a given numerical value of $n$ are connected by means of a line $A_nB_1$ and a plurality of lines $A_nB_1$ is drawn each of the said lines corresponding to a definite numerical value of $n$. In a similar manner a plurality of lines $A_mC_1$ is drawn each of the said lines corresponding to a definite numerical value of $m$. For instance a line $A_3B_1$ is obtained by connecting all the points for which $n=3$ or a line $A_{n_1}B$ is obtained by connecting all the points for which $n=n_1$. In a similar manner a line $A_{m_1}C$ is obtained by connecting points having $m=m_1$.

Figure 2:
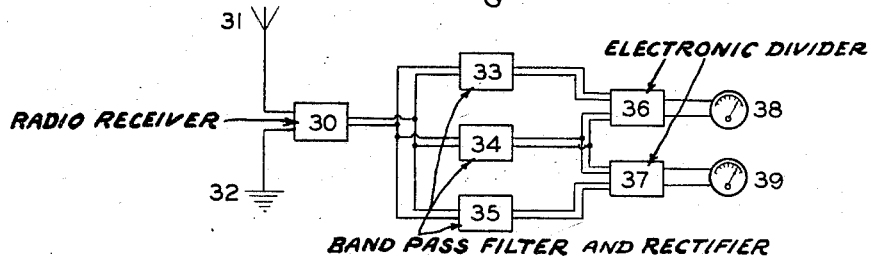
Fig. 2 shows diagrammatically an indicating apparatus which is located in the craft and gives indications allowing to determine the position of the craft on the navigational map of Fig. 1.

Thus the navigational map as described above is located in the craft enables the pilot to express any point in the given geographical region by means of two numbers: $n$ and $m$. It also enables the pilot to determine the location of a point in the map if the two numbers $n$ and $m$ corresponding to the point are given. The pilot is also provided with an indicating apparatus such as shown in Fig. 2. The indicating apparatus is adapted to receive signals from the radiation patterns of the transmitting stations A, B and C and to produce automatically and continuously an indication of the two numbers: $n$ and $m$, representing the positional coordinates of the craft on the navigational map. Thus the pilot by observing the indications of the indicating apparatus of Fig. 2 and referring these indications to the navigational map of Fig. 1 is able to locate the position of his craft.

Referring now more particularly to Fig. 2 there is shown a radio receiver 30 connected across a suitable antenna structure 31 and ground 32 on the airplane. The receiver 30 includes a radio frequency amplifier and a radio frequency rectifier. The respective signals transmitted by the antennas A, B, C (see Fig. 1) are received by the antenna 31 and become subsequently amplified and demodulated in the receiver 30. Thus across the output terminals of the receiver 30 appear the modulating frequencies $f_A$, $f_B$, $f_C$ which were sent by the antennas A, B and C respectively. The output terminals of the receiver 30 are connected to the blocks 33, 34, 35, each of the said blocks 33, 34, 35 containing a band pass filter and a rectifier. The band pass filter of the block 33 is made to transmit the frequency $f_B$, and the band pass filters of the blocks 34, 35 are made to transmit the frequencies $f_B$, $f_C$ respectively.

It is apparent that the outputs of the blocks 33, 34, 35 represent signals derived from the demodulator and having frequencies $f_A$, $f_B$, $f_C$ respectively. In order to indicate the value $n$ it is necessary to produce a ratio of the output of the rectifier contained in the block 34 to the output of the rectifier contained in the block 33. Similarly, the value $m$ will correspond to the ratio of the output of the rectifier contained in the block 34 to the output of the rectifier contained in the block 35.

The respective ratios of the electric signals may be obtained by means of arrangement which I designate as "electronic dividers" and represent them schematically in Fig. 2 by blocks 36 and 37.

The electronic divider will be briefly explained hereafter. It constitutes the subject matter of the U. S. Patent 2,129,880 granted to Serge A. Scherbatskoy and Jacob Neufeld on September 13, 1938.

Referring now again to Fig. 2, the electronic divider 36 receives across its input terminals voltages derived from the blocks 34 and 22 respectively and produces across its output terminals a voltage indicating the ratio of the two input voltages. Similarly, the electronic divider 37 receives across its input terminals voltages derived from the blocks 34, 35 respectively, and produces across its output terminals a voltage indicating the ratio of the two input voltages. The outputs of the electronic dividers 36, 37 are connected to the indicating instruments 38 and 39 respectively.

It is now apparent that the indicating instruments 38, 39 indicate automatically and continuously the values $n$ and $m$ representing the positional coordinates of the craft. By referring these values to the navigational map of Fig. 1 the pilot determines the corresponding coordinate curves $A_nB_1$ and $A_mC_1$, the intersection of which gives the location of the craft.

Consider now the electronic divider designated by block 36 or 37. Either of blocks 36 or 37 represents a transducer provided with two pairs of input terminals and one pair of output terminals and adapted to produce across the output terminals a voltage representing the ratio of the two input terminals. In order to understand better my invention, I am including hereafter a diagram of an electronic divider, shown in Fig. 3 and some explanatory remarks referring to Fig. 3.

Figure 3:
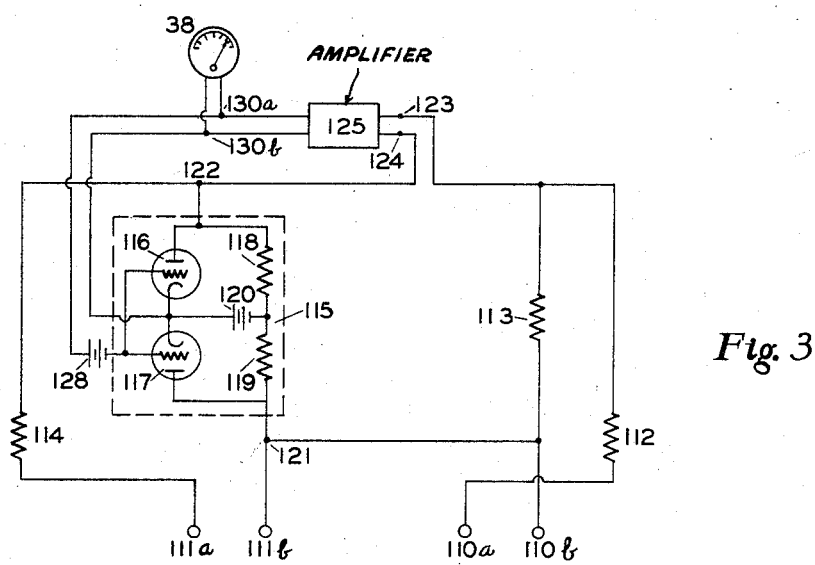
Fig. 3 shows an electronic divider which constitutes one of the elements of the indicating apparatus of Fig. 2.

It is understood that my invention refers to an arrangement substantially as shown in Fig. 2, and that Fig. 3 refers only to one of the elements of Fig. 2, and namely to an electronic divider designated by 36 or 37.

Briefly, in Fig. 3 numerals 110a, 110b and 111a, 111b designate two pairs of input terminals and the numerals 130a, 130b designate the output terminals of an electronic divider. As stated above, an electronic divider is adapted to produce across its output terminals a voltage, representing substantially the ratio of voltages, applied respectively across the input terminals 110a, 110b and 111a, 111b. The input terminals 110a, 110b are connected to a circuit consisting of a resistance 112 in series with a resistance 113. The input terminals 111a, 111b are connected to a circuit consisting of a resistance 114 in series with a circuit arrangement designated by a block 115, the said circuit arrangement comprising two three electrode vacuum discharge tubes 116 and 117 connected in push-pull, two resistors 118, 119 connected across the anodes of the tubes 116, 117 respectively and a battery 120 inserted between the cathodes of the tubes 116, 117 and the common terminal of the resistors 118, 119 respectively. The terminal 121 of 115 is connected directly to one of the terminal of 113 while the other terminal of 113 and the terminal 122 of 115 are respectively connected to the input terminals 123, 124 of a D. C. amplifier 125. The D. C. amplifier 125 is of a push-pull type well known in the art. One of the output terminals of the amplifier 125 is connected to the cathodes of the tubes 116, 117 and the other output terminal of 125 is connected through the battery 128 to the grids of the tubes 116, 117. Both output terminals of 125 are also connected to the output terminals 130a, 130b of the electronic divider. Fig. 3 shows also the indicating instrument 38 connected across the output terminals 130a, 130b of the electronic divider. The indicating instrument 38 is of the same type as the one designated by the same numeral in Fig. 2.

The operation of this arrangement can be explained as follows:

Let R designate the resistance of 112 or 114, these two resistances being equal one to another and let $r_1$ designate the resistance of 113. The electric circuit contained in the block 115 and inserted between the terminals 121, 122 acts primarily as a resistance; let the latter be represented by $r_2$. It is apparent that the value of $r_2$ depends among other things upon the plate-cathode resistances of the tubes 116 and 117. On the other hand, the plate cathode resistances of the tubes 116, 117 are functions of their grid biases, the latter being determined by the voltage between the terminals 130a, 130b.

Consequently the voltage between the terminals 130a, 130b can be used for controlling the equivalent resistance $r_2$ of the block 115, and the magnitude of this voltage determines the value of the resistance $r_2$.

The current flowing from the terminal 110a into the resistor 112 in series with the resistor 113 and returning to the terminal 110b can be expressed as follows:

$$i_1 = \frac{E_1}{R + r_1} \quad (1)$$

Assuming that $r_1 \ll R$ the Expression 1 reduces to $$i_1 = \frac{E_1}{R} \quad (2)$$

and the voltage across the terminals of the resistance 113 can be expressed as follows:

$$v_1 = i_1 r_1 = \frac{E_1 r_1}{R} \quad (3)$$

In a similar manner, the current flowing from the terminal 111a into the resistor 114 and traversing the block 115 from the terminal 122 to the terminal 121 and entering into the terminal 111b can be expressed as follows:

$$i_2 = \frac{E_2}{R + r_2} \quad (4)$$

Assuming that $r_2 \ll R$ the Expression 4 reduces to $$i_2 = \frac{E_2}{R} \quad (5)$$

and the voltage across the terminals 122 and 121 becomes $$v_2 = i_2 r_2 = \frac{E_2 r_2}{R} \quad (6)$$

The voltages $v_1$ and $v_2$ oppose each other in such a manner that the voltage $v_3$ across the input terminals 123, 124 of the D. C. amplifier 125 is equal to the difference of $v_1$ and $v_2$, i. e., $$v_3 = v_1 - v_2 = \frac{1}{R}[E_1 r_1 - E_2 r_2] \quad (7)$$

and the amplified voltage across the output terminals 130a, 130b of the D. C. amplifier is $$v_4 = K v_3 = \frac{K}{R}[E_1 r_1 - E_2 r_2] \quad (8)$$

where K is an amplification factor.

The voltage $v_4$ in series with the voltage of the battery 128 constitutes the grid bias of the tubes 116, 117. It is apparent that $v_4$ determines the plate resistance of the tubes and also determines the resistance $r_2$ of the block 115. Under the conditions shown in the figure the value of $r_2$ is such as to render the expression $$v_3 = \frac{1}{R}[E_1 r_1 - E_2 r_2] \quad (9)$$

very small, i. e., $$v_3 \ll \frac{E_1 r_1}{R}$$

and $$v_3 \ll \frac{E_2 r_2}{R}$$

Assume that the Expression 9 is zero, i. e., $$\frac{1}{R}[E_1 r_1 - E_2 r_2] = 0 \quad (10)$$

whence $$r_2 = \frac{E_1}{E_2} r_1 \quad (11)$$

Let $r_1$ be equal to one ohm. Then $$r_2 = \frac{E_1}{E_2} \quad (12)$$

It is thus seen from the Formula 12 that the magnitude of the resistance $r_2$ numerically expresses the ratio of the voltages $E_1$ and $E_2$. Consequently the problem of determining the ratio of voltages across the terminals 110a, 110b and 111a, 111b is equivalent to determining $r_2$, i. e., the equivalent resistance of the block 115 between the terminals 121 and 122. On the other hand the value of $r_2$ is controlled and determined by the voltage $v_4$ across the output terminals 130a, 130b. Consequently in the Expression 12 instead of measuring the value $r_2$ expressing the ratio $E_1/E_2$ it is sufficient to determine the voltage $v_4$ which corresponds to the given value of $r_2$, the said voltage $v_4$ being measured across the output terminals 130a, 130b.

If now the relative values of the voltages $E_1$ and $E_2$ change, the voltage across the output terminals 130a, 130b will indicate a new value of the ratio $E_1/E_2$ and, in general, in case of varying input voltages the voltage across the output terminals 130a, 130b will indicate automatically and continuously the instantaneous value of their ratio.

Assume for instance that the voltage $E_2$ increases and the voltage $E_1$ is maintained constant. Then the current $i_2$ and the voltage $v_2$ will also increase, and will cause a corresponding variation of the voltage $v_3$. Then the amplified voltage $v_4$ derived from the output terminals of 125 changes its value in such a manner as to cause a decrease of the resistance $r_2$ of the block 115. Then the voltage drop $v_2$ across the resistor $r_2$ becomes again substantially equal to the voltage drop $v_1$ across the resistor $r_1$ so that the Relation 10 is substantially satisfied. It should be noted, however, that in this case the resistance $r_2$ has a different and a smaller value which corresponds to a new and a smaller value of the $E_1/E_2$. To this new value of $r_2$ corresponds the new value of $v_4$ which is directly indicated by the voltage across the output terminals 130a, 130b.

It is therefore apparent that the electrical circuit, substantially as shown and described in connection with Fig. 3 operates as an electronic divider, and may be substituted in place of blocks 36, 37 of the position indicating system shown in Fig. 2.

In view of my invention and disclosure, variations and modifications to meet individual whim or particular need will doubtless become evident to others skilled in the art, to obtain part or all of the benefits of my invention without copying the structure shown, and I, therefore claim all such in so far as they fall within the reasonable spirit and scope of my invention:

I claim:

1. In an arrangement for determining position of a craft in a certain geographical area, at least three radio transmitting stations arranged at different geographical locations in said area, each of the said stations transmitting a distinguished signal of determined character, an apparatus on the said craft comprising means responsive to the said signals and producing electric currents upon the reception of the said signals, the said electric currents having distinguished characters related to the characters of the said signals, means for receiving the said currents and for producing other electrical currents, each of the said other electrical currents indicating the relative magnitudes of at least two of the first said electrical currents, the said relative magnitudes representing positional coordinates of the craft, and a navigational map on the said craft, the said navigational map being provided with the said coordinates for indicating the position of the said craft.

2. In an arrangement for determining position of a craft in a certain geographical area, three radio transmitting stations arranged at different geographical locations in said area, each of the said stations transmitting a distinguished signal of determined character, an apparatus on the said craft comprising means responsive to the said signals for producing three electrical currents upon the reception of the said signals, the said electric currents having frequencies corresponding to the said signals, means responsive to the said currents for producing other electrical currents, the magnitudes of each of the said other electrical currents representing substantially the quotient obtained by dividing one of the said currents into each of the other said currents, the said ratios representing positional coordinates of the craft and a navigational map on the said craft, the said navigational map being provided with the said coordinates for indicating the position of the said craft.

3. In an apparatus for determining position of a craft in a certain geographical area, at least three radio transmitting stations arranged at different geographical locations in the said area, each of the said stations radiating a wave having distinguished character, means on the said craft responsive to the said waves and providing numerical indications representing determined functional relationships between the strengths of the said waves, the said numerical indications representing positional coordinates of the craft and a navigational map on the said craft, the said navigational map being provided with coordinated loci of the said functional relationships between the strengths of the said waves, whereby the position of the craft may be determined by interpretation of said numerical indications from the coordinated loci on the map.

4. In an apparatus for determining position of a craft in a certain geographical area, at least three radio transmitting stations arranged at different geographical locations in the said area, each of the said stations radiating a wave having a distinguished character, a means on said craft responsive to the said waves for producing currents, the magnitudes of which indicate numerically determined functional relationships between the strengths of the said waves, and represent positional coordinates of the craft and a navigational map on the said craft, the said navigational map being provided with coordinated loci of the functional relationships, whereby the position of the craft may be determined by interpretation of the numerical indications of magnitudes of the said currents from the coordinated loci on the map.

5. In an apparatus for determining position of a craft in a certain geographical area, at least three radio transmitting stations arranged at different geographical locations in the said area, each of the said stations radiating a wave having a distinguished character, an indicating means on said craft responsive to the said waves for numerically indicating substantially ratios of the strengths of the said waves, the said ratios representing positional coordinates of the said craft, and a navigational map on the said craft, the said navigational map being provided with coordinated loci of the said ratios whereby the position of the craft may be determined by interpretation of numerical indications of said ratios from the coordinated loci on the map.

6. In an arrangement for determining position of a craft in a certain geographical area, at least three radio transmitting stations arranged at different geographical locations in said area, each of the said stations transmitting a distinguished signal of determined character, an apparatus on the said craft comprising means responsive to the said signals and producing electrical currents upon the reception of the said signals, the said electrical currents having characteristics corresponding to the characteristics of the said signals, means for receiving the said currents and for producing other electrical currents representing determined functional relationships between the first said electrical currents, the said functional relationships representing positional coordinates of the said craft, and a navigational map on the said craft, the said navigational map being provided with the said coordinates for indicating the position of the said craft.

7. In an arrangement for determining position of a craft in a certain geographical area at least three radio transmitting stations arranged at different geographical locations in the said area, each of the said transmitting stations establishing in the space in which the craft is located a distinct and identifiable radiation pattern, an apparatus on the said craft, the said apparatus comprising a receiving means responsive to the said radiation patterns and producing electrical currents, the said currents having characteristics corresponding to the characteristics of the said radiation patterns, means responsive to the said currents for producing indications representing substantially quotients of the strengths of the said currents, and a navigational map giving various geographical locations with reference to the said quotients, whereby the position of the craft may be determined by referring the said indications to the said navigational map.

8. In an apparatus for determining position of a craft in a certain geographical area, at least three radio transmitting stations arranged at different geographical locations in said area, each of the said stations radiating a wave having a distinguished character, means on the said craft responsive to the said waves and producing currents, the magnitude of each of the said currents representing individually the numerical value of the relative strengths of at least two of the said waves and indicating a positional coordinate of the said craft, and a navigational map on the said craft, the said navigational map being provided with coordinated loci of said relative strengths whereby the position of the craft may be determined by interpretation of the said numerical values from the coordinated loci on the map.

9. The method of determining position of a craft in a given geographical area which comprises radiating at least three distinguished signals from different locations in the said area, receiving said signals and producing electrical currents, the strength of each of the said currents representing individually the numerical value of the relative magnitudes of at least two of the said signals, producing a diagrammatic representation of the said area, providing the said representation with coordinated loci of the said relative magnitudes at different locations on the said area, whereby the said position may be determined by interpretation of the said numerical values from the said coordinated loci.

10. The method of determining position of a craft in a given geographical area which comprises radiating at least three distinguished signals from different locations in the said area, receiving said signals and producing electrical currents representing magnitudes of the said signals, producing other electrical currents, the strength of each of the said other currents representing individually the numerical value of the relative magnitudes of the first said currents, producing a diagrammatic representation of the said area, providing the said representation with coordinated loci of the said relative magnitudes at different locations on the said area, whereby the said position may be determined by interpretation of the said numerical values from the said coordinated loci.

11. The method of determining position of a craft in a given geographical area which comprises radiating at least three distinguished signals from different locations in the said area, receiving said signals and producing electrical currents, the magnitudes of the said currents indicating substantially the numerical values of the quotients of the strengths of the said signals, producing a diagrammatic representation of the said area, providing the said representation with coordinated loci of the said relative magnitudes at different locations on the said area, whereby the said positions may be determined by interpretation of the said numerical values from the said coordinated loci.

12. The method of determining position of a craft in a given geographical area which comprises radiating at least three distinguished signals from different locations in said area, receiving said signals and producing electrical currents representing magnitudes of the said signals, producing numerical indications representing substantially quotients of the magnitudes of the said currents, producing a diagrammatic representation of the said area, providing the said representation with coordinated loci of the said relative magnitudes at different locations on the said area, whereby the said positions may be determined by interpretation of the said numerical values from the said coordinated loci.

13. The method of determining position of a craft in a given geographical area which comprises radiating at least three distinguished signals from different locations in the said area, receiving said signals and producing electrical currents representing magnitudes of the said signals, producing other electrical currents the magnitudes of which represent substantially the numerical values of the quotients of the strengths of the first said electrical currents, producing a diagrammatic representation of the said area, providing the said representation with coordinated loci of the said relative magnitudes at different locations on the said area, whereby the said positions may be determined by interpretation of the said numerical values from the said coordinated loci.

JACOB NEUFELD.